United States Patent
Platz et al.

(10) Patent No.: US 9,108,527 B2
(45) Date of Patent: Aug. 18, 2015

(54) COOLING OF ELECTRIC STORAGE UNITS IN A VEHICLE

(71) Applicant: Bayerische Motoren Werke Aktiengesellschaft, Munich (DE)

(72) Inventors: Christoph Platz, Unterschleissheim (DE); Achim Gordner, Grossberghofen (DE); Fabian Kind, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/090,123

(22) Filed: Nov. 26, 2013

(65) Prior Publication Data

US 2014/0083783 A1    Mar. 27, 2014

Related U.S. Application Data

(63) Continuation of application No. PCT/EP2012/061623, filed on Jun. 19, 2012.

(30) Foreign Application Priority Data

Jun. 29, 2011    (DE) .................. 10 2011 078 267

(51) Int. Cl.
*B60K 1/04*    (2006.01)
*B60L 11/18*    (2006.01)
*B60K 1/00*    (2006.01)

(52) U.S. Cl.
CPC ............... *B60L 11/1874* (2013.01); *B60K 1/04* (2013.01); *B60K 2001/005* (2013.01); *B60Y 2200/12* (2013.01); *B62K 2202/00* (2013.01); *B62K 2204/00* (2013.01); *B62K 2208/00* (2013.01)

(58) Field of Classification Search
CPC .... B60K 1/04; B60K 11/06; B60K 2001/005; B60K 2001/0438; B60L 11/1874; B62K 2204/00; B62K 2202/00; B62K 2208/00
See application file for complete search history.

(56) References Cited

U.S. PATENT DOCUMENTS 5,207,288 A * 5/1993 Ono ............................. 180/220
5,421,427 A * 6/1995 Ogawa et al. ................. 180/220
5,477,936 A * 12/1995 Sugioka et al. .............. 180/68.5

(Continued)

FOREIGN PATENT DOCUMENTS

DE    10 2008 051 085 A1    4/2010
JP    10-297570 A    11/1998

(Continued)

OTHER PUBLICATIONS

German Office Action dated Mar. 2, 2012 w/ English translation (nine (9) pages).

(Continued)

*Primary Examiner* — Katy M Ebner
(74) *Attorney, Agent, or Firm* — Crowell & Moring LLP

(57) ABSTRACT

A vehicle includes a front wheel, a rear wheel, an electric driving motor, which is designed to drive the rear and/or front wheel, and several electric storage units, which are accommodated inside a storage housing. The storage housing has at least one air duct for discharging thermal energy of the storage units. The air duct extends in the longitudinal direction of the vehicle at least in one air inflow region and is arranged such that, in an operating state of the vehicle, ambient air flows into the air duct by way of head wind so as to discharge the thermal energy.

20 Claims, 3 Drawing Sheets

(56) References Cited

U.S. PATENT DOCUMENTS

| | | | |
|---|---|---|---|
| 5,513,721 A * | 5/1996 | Ogawa et al. | 180/220 |
| 5,577,747 A * | 11/1996 | Ogawa et al. | 180/220 |
| 5,583,418 A * | 12/1996 | Honda et al. | 320/109 |
| 5,613,569 A * | 3/1997 | Sugioka et al. | 180/68.5 |
| 7,735,590 B2 * | 6/2010 | Horii et al. | 180/68.4 |
| 7,746,034 B2 | 6/2010 | Lee et al. | |
| 7,924,562 B2 * | 4/2011 | Soma et al. | 361/694 |
| 2009/0320715 A1 * | 12/2009 | Morita et al. | 105/51 |
| 2010/0059299 A1 | 3/2010 | Hoermandinger et al. | |
| 2010/0163326 A1 * | 7/2010 | Takamura et al. | 180/68.5 |

FOREIGN PATENT DOCUMENTS

| | | |
|---|---|---|
| JP | 11-178115 A | 7/1999 |
| JP | 2001-102099 A | 4/2001 |

OTHER PUBLICATIONS

International Search Report dated Apr. 10, 2013 w/ English translation (six (6) pages).

German-language Written Opinion (PCT/ISA/237) dated Apr. 10, 2013 (nine (9) pages).

\* cited by examiner

COOLING OF ELECTRIC STORAGE UNITS IN A VEHICLE

CROSS REFERENCE TO RELATED APPLICATIONS

This application is a continuation of PCT International Application No. PCT/EP2012/061623, filed Jun. 19, 2012, which claims priority under 35 U.S.C. §119 from German Patent Application No. DE 10 2011 078 267.2, filed Jun. 29, 2011, the entire disclosures of which are expressly incorporated by reference herein.

BACKGROUND AND SUMMARY OF THE INVENTION

The present invention relates to a vehicle having at least one front wheel, at least one rear wheel, an electric driving machine constructed for driving the at least one rear and/or front wheel, and several electric storage units which are accommodated within a storage housing.

Currently, vehicle manufacturers are increasingly focusing on vehicles having a hybrid drive or a pure electric drive. Such vehicles require electric energy storage devices for supplying the respective electric drive with electric energy.

The efficiency of the energy storage devices and, therefore, the available energy, are considerably dependent on the temperature of the energy storage devices, so that the latter, if possible, have to be maintained in an optimal temperature range in order to be able to retrieve a power that is as high as possible. However, since, during the operation of the vehicle or when supplying electric energy, the energy storage devices generate thermal energy in the form of heat, and thereby heat up beyond the optimal temperature range, a cooling of the energy storage devices has to be provided.

Known cooling devices, however, normally require electric energy themselves so that, as a result, on the one hand, the capacity available for the drive and, therefore, a range of the vehicle, is considerably reduced and, on the other hand, the energy storage devices produce additional heat.

It is therefore an object of the invention to provide improved cooling for electric energy storage devices for vehicles, which reduces or can even eliminate the above-mentioned disadvantages.

According to the invention, this and other objects are achieved by a vehicle having at least one front wheel, at least one rear wheel, an electric driving machine constructed for driving the at least one rear and/or front wheel, and several electric storage units which are accommodated within a storage housing. The storage housing includes at least one air duct for discharging thermal energy of the storage units, which duct extends, at least in one air inflow area, in the longitudinal direction of the vehicle and is arranged such that, in an operating state of the vehicle, ambient air flows into the air duct via the air stream so as to discharge the thermal energy. The object are also achieved as well by a storage housing for such a vehicle.

Accordingly, a vehicle according to the invention is disclosed that has at least one front wheel, at least one rear wheel, an electric driving machine constructed for driving the at least one rear and/or front wheel, and several electric storage units accommodated within a storage housing. In addition, the storage housing has at least one air duct for discharging thermal energy of the storage units, which extends, at least in one air inflow area, in the longitudinal direction of the vehicle and is arranged such that, in an operating state of the vehicle, ambient air flows into the air duct by way of the air stream so as to discharge the thermal energy.

The at least one air duct preferably extends essentially in the longitudinal direction of the vehicle.

In a vehicle having an electric energy storage device, which may consist of several storage units, the term "storage unit" includes particularly battery cells, capacitors or other devices which are suitable and intended for storing electric energy. The individual storage units may be parallel and/or serially interconnected with one another. Several storage units may be interconnected with one another to form a storage module. The electric energy storage device may have several mutually interconnected "storage housings". The storage modules are, in turn, accommodated in the "storage housing".

According to the invention, the at least one air duct is provided for discharging excess thermal energy by way of ambient air. This means that a transmission of thermal energy takes place from the storage units to the air duct and from the latter, in turn, to the inflowing ambient air.

For this purpose, the air duct is further developed such that ambient air can be introduced into the air duct by way of the air stream. This is achieved particularly by an orientation of the air duct and/or at least of the air inflow area or of an inlet opening of the air duct in the longitudinal direction of the vehicle, so that, during the operation of the vehicle, at least in the case of a longitudinal movement of the vehicle, the air surrounding the vehicle flows into the air duct as a result of the vehicle movement.

If only the air inflow area of the air duct is oriented in the longitudinal direction of the vehicle, for example, as a knee, a section of the air duct that follows may extend in any direction. In particular, the latter may also be arranged transversely to the longitudinal direction, so that the discharged air can be discharged laterally, upwards and/or downwards from the vehicle.

If, in contrast, the air duct is arranged essentially in the longitudinal direction, an inflow as well as a significant portion of the flow through the air duct takes place in the longitudinal direction of the vehicle. A direction that deviates therefrom may be provided, for example, for an outlet, as will be described in detail in the following.

In both described embodiments, the cooling therefore takes place in a passive manner, i.e. without the use of active cooling.

According to an embodiment, the electric storage units are arranged in at least two planes within the storage housing, and the at least one air duct is, in each case, arranged as an intermediate plane between two neighboring planes. Furthermore, for exchanging thermal energy with the inflowing ambient air, the at least one air duct is connected in a heat-conducting manner with at least one of the storage units.

Accordingly, the storage units and the at least one air duct may be arranged in several layers parallel to one another. For example, the storage units may be arranged in two layers and an air duct may be arranged in-between as an intermediate plane. In the following, an example will be illustrated in the figures. Naturally, several layers may also be provided which are each separated from one another by an air duct as an intermediate plane.

The air duct is preferably constructed as part of the wall of the storage housing. The air duct may particularly comprise a conduit that is closed in the circumferential direction, or several conduits. The air duct is, for example, constructed as a hollow section for this purpose.

The air duct may be part of the storage housing and, together with a first surface, particularly an interior side of its conduits, a section of an exterior surface of the storage housing and, with a second surface, form a section of an interior surface of the storage housing.

According to a further embodiment, the storage housing has a watertight construction, so that a penetrating of water into the interior of the storage housing is prevented. In this manner, the storage units arranged in the storage housing will be protected from water but also from all kinds of dirt. Particularly the air duct that extends through the storage housing and therefore, although it provides a passage, establishes no connection between an environment and the interior of the storage housing, which is closed off in a waterproof manner and in which the storage units are arranged, should not be understood to be the interior of the storage housing.

For example, at least in sections or completely, the storage housing may be constructed as a casting. Furthermore, the air duct can be connected in one piece with the storage housing.

According to a preferred embodiment, an air inlet opening of the at least one air duct is arranged at a frontal side of the storage housing pointing in the driving direction of the vehicle such that, in an operating state of the vehicle, ambient air flows into the air duct via the air stream. Accordingly, the air inlet opening is provided directly in the storage housing and the air stream can therefore flow directly against the air inlet opening. No feeders for the inflowing ambient air are therefore required. However, for an improved inflow, air-conducting or air-guiding feeders, such as funnel-shaped, narrowing and/or angled or bent feeders, may be provided.

In order to achieve a cooling effect of the air duct that is as advantageous as possible, in addition to the described air inlet opening, the air duct may also have air outlet openings through which the inflowing ambient air is discharged, and therefore a continuous flow through the air duct can be achieved.

According to an embodiment, at least one outlet opening of the air duct is therefore arranged laterally at the storage housing, for the lateral discharge from the vehicle of the ambient air flowing into the air duct. This means that the air flowing into the air duct is guided in the air duct and exits from the air duct through the lateral outlet openings and is thereby returned to the environment. The at least one outlet opening is preferably arranged in a section of the air duct or of the storage housing that is in the rear with respect to the driving direction. In the case of an air duct extending essentially in the longitudinal direction of the vehicle, a corresponding flow through the described at least one outlet opening takes place, which flow is oriented in the longitudinal direction.

According to another embodiment, the at least one outlet opening of the air duct for discharging from the air duct the ambient air that flows into the air duct is arranged in the area of the rear wheel. This means that the ambient air that flows through the air duct flows through the air duct, or through the storage housing comprising the air duct, and exits at an end that is in the rear with respect to the driving direction or a rear face in the area of the rear wheel. Preferably, the exiting ambient air is introduced into the wheel case of the rear wheel while taking into account aerodynamic aspects.

Naturally, a combination of the arrangement of the outlet openings is also contemplated, so that at least one lateral outlet opening as well as at least one outlet opening in the area of the rear wheel can be provided.

According to a further embodiment, at least one active fan is assigned to the air duct for assisting the flow of ambient air through the air duct. The fan may be constructed as a ventilator and assist a flow through the air duct. This particularly makes sense, for example, when the air stream is too weak because of a low vehicle speed or is absent during a brief stop of the vehicle. However, there is no demand or only a slight demand during a longer stop because, in this case, the storage units will not heat up further since there is no stress. The at least one active fan therefore has to be used only in situations that are limited with respect to time, so that an energy demand and a consumption of electric energy connected therewith can be minimized.

The at least one active fan is preferably arranged in the area of the air duct. This means that the at least one active fan can be arranged inside the air duct but also in front or behind the air duct, particularly in the area of the inlet openings and/or the outlet openings. As a result, a simple mounting and an easy serviceability are achieved.

In addition, the at least one air duct may have cooling fins. In this manner, a transmission of thermal energy from the air duct or its wall to the air flowing through can be increased and improved.

The above-described cooling can be used in vehicles of many different types. The vehicle preferably is a two-wheel vehicle, particularly a motorcycle or a motor scooter. Likewise, the vehicle may, however, also be a three-wheeler or a four-wheeler, particularly a motorcycle-like vehicle, such as a so-called trike or quad, as well as a three-wheeled or four-wheeled motorcycle.

As mentioned above, the storage units may comprise battery cells and/or capacitors.

Furthermore, a storage housing for a vehicle is provided for accommodating several electric storage units, the storage housing being constructed according to the given description.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
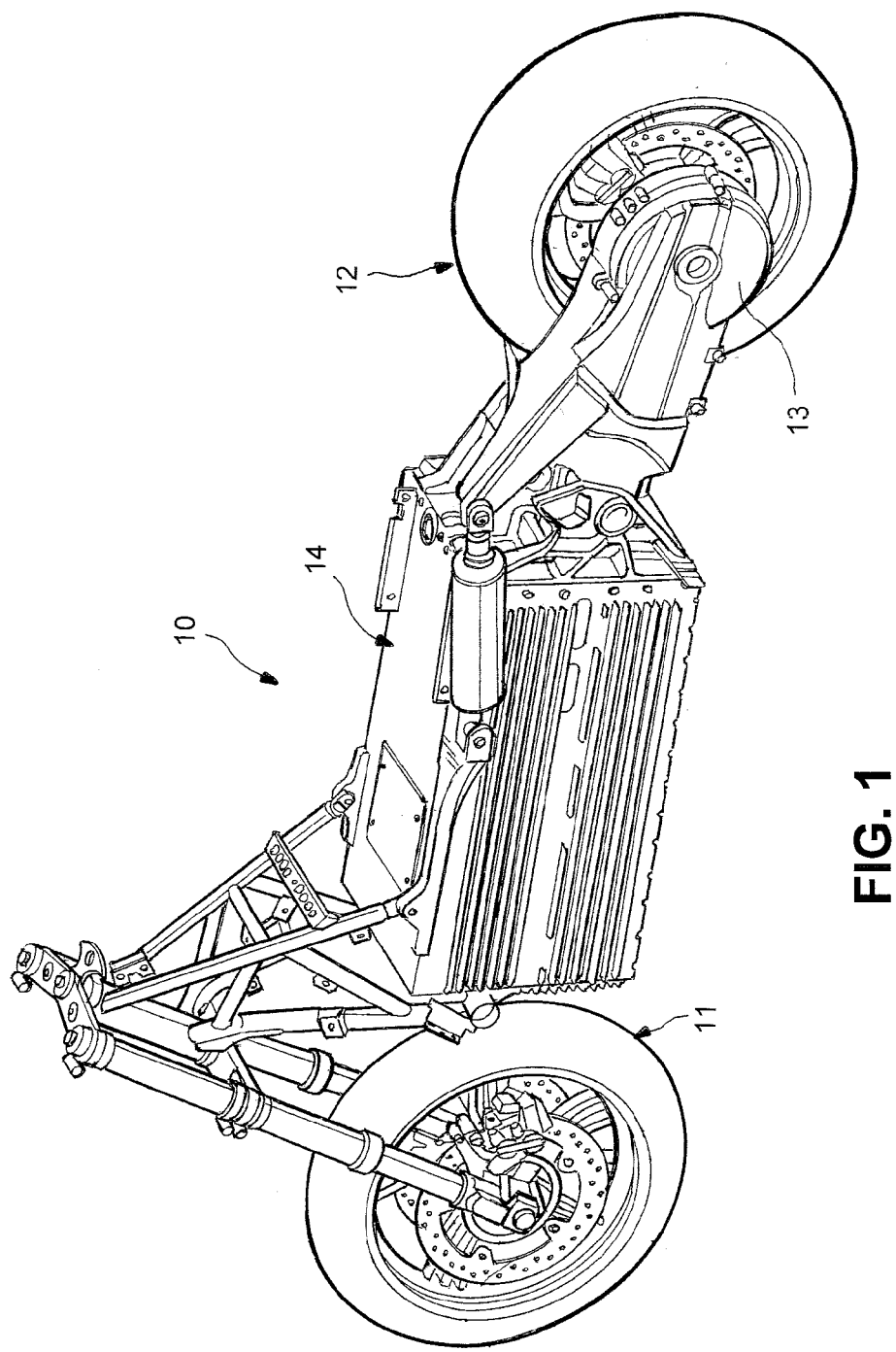
FIG. 1 is a perspective view of an exemplary vehicle according to the invention having a storage housing with an air duct.

FIG. 1 illustrates a vehicle 10 having a front wheel 11 and a rear wheel 12 as well as an electric driving machine 13. The latter is constructed for driving the rear wheel 12 and is supplied with electric energy by way of a number of storage units (compare FIG. 3). The storage units are arranged in a storage housing 14, which will be described in the following.

Figure 2:
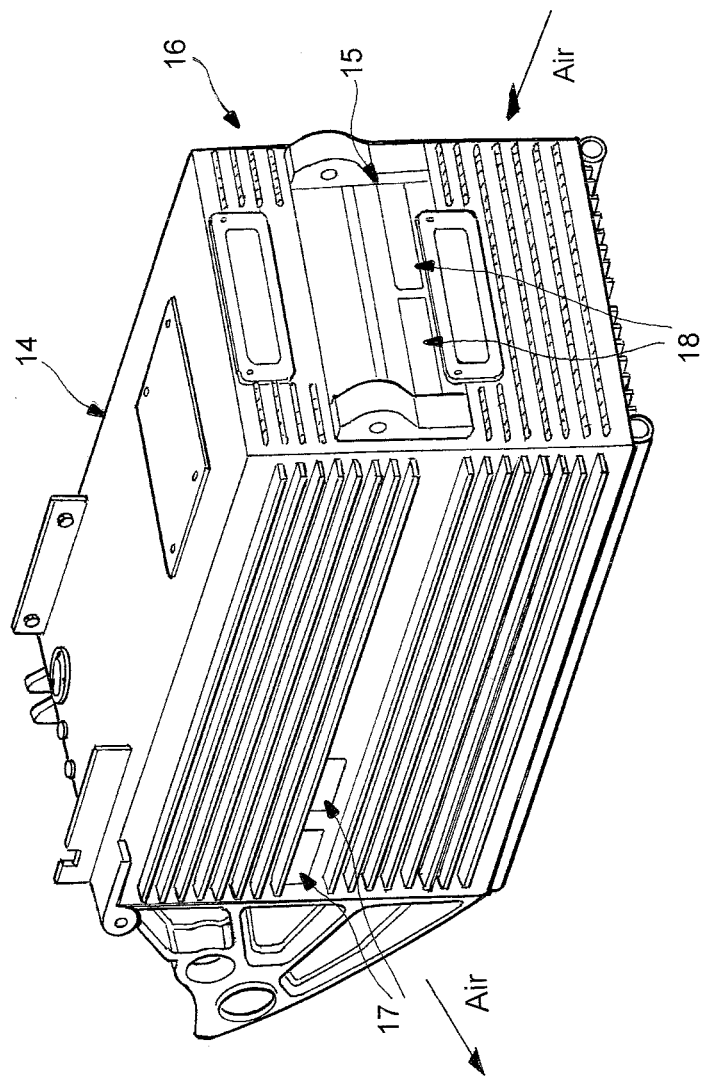
FIG. 2 is a perspective view of an exemplary storage housing according to the invention for a vehicle according to FIG. 1.
Figure 3:
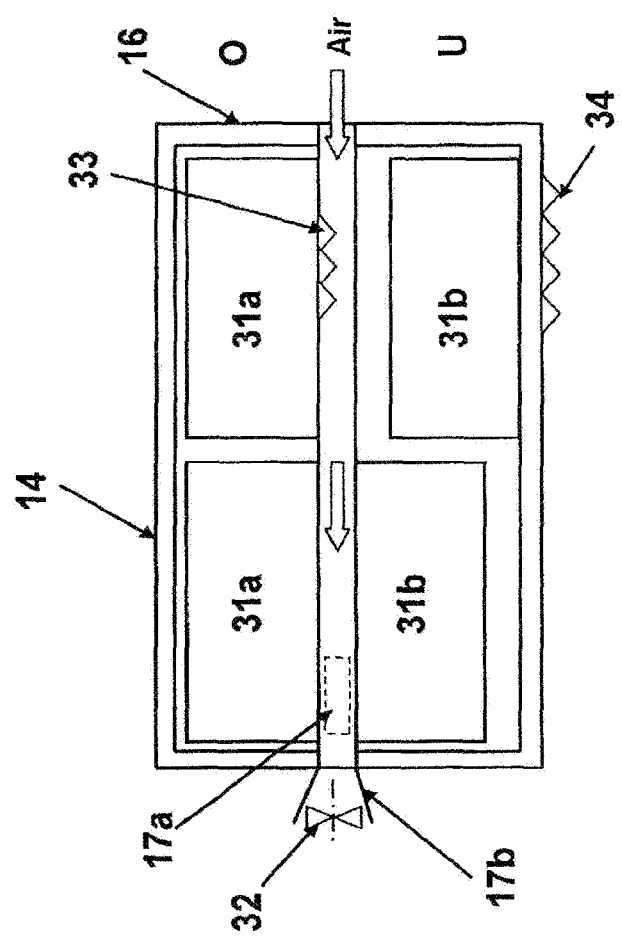
FIG. 3 is a schematic, lateral sectional view of the storage housing according to FIG. 2.

FIG. 2 is a detailed view of the storage housing 14 shown in FIG. 1 for the vehicle 10. The storage housing 14 has an essentially cuboid-shaped base body in which the storage units illustrated in FIG. 3 are arranged in a waterproof fashion. By way of an air duct 15, the storage housing 14 is divided into an upper and a lower plane. On a first face side 16 of the storage housing 14, the air duct 15 has a two-part air inlet opening 18 for the entering of ambient air into the air duct 15, each of the air inlet openings 18 of the air duct 15 being assigned to a conduit of the air duct 15. The air duct 15 or its two conduits extend in a longitudinal direction of the storage housing 14, which simultaneously also defines the longitudinal direction of the vehicle 10. This is done so that, in an operating state of the vehicle 10, thus, particularly during a drive, ambient air (compare arrow) flows by way of the air stream into the air duct for discharging thermal energy. At the two lateral surfaces (only one lateral surface is shown), outlet openings 17 of the air duct 15 are in each case provided for discharging ambient air that flows into the air duct 15.

FIG. 3 is a schematic, lateral sectional view of the storage housing 14 according to FIG. 2. As described above, the air duct 15 extends as a horizontal intermediate plane through the storage housing 14 and divides the latter into an upper plane O and a lower plane U. In the respective planes, storage units 31a (upper plane O) and 31b (lower plane U) are arranged, in which case these may each have an identical construction. The storage units 31a of the upper plane are directly connected with a wall of the air duct 15, in that this wall is used as a supporting floor. A bonding between the storage unit 31a and the wall of the air duct is preferably optimized for a good heat conduction, in order to achieve an exchange of thermal energy that is as good as possible. For example, an extensive bonding and/or a thermal compound can be used for this purpose.

The storage units 31b of the lower plane (U) can be arranged in a different manner in the storage housing 14. Only as an example, FIG. 3 shows two different variants, in which case the storage units can each be arranged in the same manner. Accordingly, the storage units 31b can be fastened on a wall of the storage housing 14 used as a floor and can preferably be connected with this wall in a heat-conducting manner. Thus, thermal energy can at least partially be yielded by the storage unit 31b first to the wall and from the latter to a cooling air flow which flows below or laterally around the wall particularly during the drive. A further fraction can be transmitted by way of the wall to the air duct 15 connected with the wall, which air duct 15 yields a portion of the thermal energy to the ambient air flowing through the air duct 15.

As an alternative, the storage units 31b of the lower plane can be connected with the air duct 15 in a directly heat-conducting manner. They may, for example, be "suspended" on the latter. A transmission of the thermal energy of the storage unit 31b takes place corresponding to the description to the storage units 31a of the upper plane.

In each case, the thermal energy absorbed by the wall of the air duct 15 is yielded to the ambient air flowing through the air duct, which ambient air, after flowing through the air duct, exits through the lateral outlet opening 17a and/or a rear outlet opening 17b. At least one active fan or a ventilator 32 may be provided for assisting the flow through the air duct 15. As required, for example, during a slow drive or during a stoppage of the vehicle, this fan can be connected and thereby cause a constant air flow in the air duct 15.

For an improved yielding of thermal energy to the ambient air flowing through the air duct 15, the air duct 15 may optionally include cooling fins 33, which are arranged at least in sections in an appropriate location.

The same applies to the storage housing 14, which may also have cooling fins 34 in appropriate locations, particularly in areas surrounded by flowing air, as in a floor section or the lateral walls.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
at least one front wheel;
at least one rear wheel;
an electric driving machine configured to drive the at least one rear and/or front wheel;
a storage housing, in which are stored a plurality of electric storage units, wherein
the storage housing has at least one air duct configured to discharge thermal energy of at least two adjacent ones of the plurality of electric storage units,
the air duct extends in a longitudinal direction of the vehicle, at least in one air inflow area, and is arranged such that, in an operating state of the vehicle, ambient air flows into the air duct via an air stream so as to discharge the thermal energy,
the air duct is located between adjacent ones of the plurality of electric storage units, and
the air duct is circumferentially closed such that there is no connection between the ambient air and an interior of the storage housing containing the plurality of electrical storage units.

2. The vehicle according to claim 1, wherein a substantial extent of the air duct extends substantially in the longitudinal direction of the vehicle.

3. The vehicle according to claim 2, wherein
the air duct is connected in a heat-conducting manner with at least one of the electric storage units for an exchange of thermal energy with inflowing ambient air.

4. The vehicle according to claim 1, wherein the air duct is constructed as part of a wall of the storage housing.

5. The vehicle according to claim 2, wherein the air duct is constructed as part of a wall of the storage housing.

6. The vehicle according to claim 1, wherein the storage housing is constructed in a waterproof manner to prevent water penetrating into the interior of the storage housing.

7. The vehicle according to claim 3, wherein the storage housing is constructed in a waterproof manner to prevent water penetrating into the interior of the storage housing.

8. The vehicle according to claim 1, wherein an air inlet opening of the air duct is arranged at a frontal side of the storage housing in a driving direction of the vehicle such that, in the operating state of the vehicle, ambient air flows into the air duct via the air inlet opening.

9. The vehicle according to claim 3, wherein an air inlet opening of the air duct is arranged at a frontal side of the storage housing in a driving direction of the vehicle such that, in the operating state of the vehicle, ambient air flows into the air duct via the air inlet opening.

10. The vehicle according to claim 1, wherein at least one outlet opening of the air duct is arranged laterally on the storage housing, the at least one outlet opening being configured for lateral discharge from the vehicle of the ambient air flowing into the air duct.

11. The vehicle according to claim 8, wherein at least one outlet opening of the air duct is arranged laterally on the storage housing, the at least one outlet opening being configured for lateral discharge from the vehicle of the ambient air flowing into the air duct.

12. The vehicle according to claim 1, wherein at least one outlet opening of the air duct is arranged to discharge the ambient air into an area of the rear wheel of the vehicle.

13. The vehicle according to claim 8, wherein at least one outlet opening of the air duct is arranged to discharge the ambient air into an area of the rear wheel of the vehicle.

14. The vehicle according to claim 10, wherein a further outlet opening of the air duct is arranged to discharge ambient air into an area of the rear wheel of the vehicle.

15. The vehicle according to claim 1, further comprising:
at least one active fan assigned to the air duct, the fan being configured to assist in the flow of ambient air through the air duct.

16. The vehicle according to claim 1, wherein the air duct comprises cooling fins.

17. The vehicle according to claim 1, wherein the vehicle is a motorcycle or a motor scooter.

18. The vehicle according to claim 1, wherein the electric storage units comprise battery cells and/or capacitors.

19. A storage housing for a vehicle, the storage housing accommodating a plurality of electric storage units, comprising:
at least one air duct being arranged through the storage housing, the air duct being configured to discharge thermal energy of at least two adjacent ones of the plurality of electric storage units;
wherein
the air duct extends, at least in one air inflow area, in a longitudinal direction of the storage housing and is configured such that, in an operating state of the vehicle in which the storage housing is mounted, ambient air flows into the air duct via an air stream so as to discharge the thermal energy of the at least two adjacent ones of the plurality of electric storage units,
the air duct is located between the at least two adjacent ones of the plurality of electric storage units, and
the air duct is circumferentially closed such that there is no connection between the ambient air and an interior of the storage housing containing the plurality of electrical storage units.

20. The storage housing according to claim 19, wherein:
an air inlet opening of the air duct is arranged at a frontal side of the storage housing; an outlet opening of the air duct is arranged to open in an area of a vehicle rear wheel when the storage housing is mounted in the vehicle and/or to open laterally from the storage housing.

* * * * *